United States Patent Office 3,265,654
Patented August 9, 1966

3,265,654
STABLE, AQUEOUS DISPERSIONS OF ETHYLENE COPOLYMERS
Dietrich Glabisch, Leverkusen, and Herbert Bartl, Cologne-Stammheim, Germany, assignors to Farbenfabriken Bayer Aktiengesellschaft, Leverkusen, Germany, a German corporation
No Drawing. Filed May 15, 1962, Ser. No. 194,981
Claims priority, application Germany, May 26, 1961, F 34,024
6 Claims. (Cl. 260—29.6)

The present invention relates to stable, aqueous emulsions of ethylene copolymers as well as to a process for production of these copolymers without addition of conventional emulsifiers. More specifically, the present invention relates to a process in which ethylene is polymerized in aqueous medium at pressures above 50 atmospheres in the presence of an ethylenically unsaturated acidic compound and a further ethylenically unsaturated polymerizable non-ionic compound with the aid of water-soluble substances being capable of forming free radicals as well as the copolymers obtained thereby.

The emulsion copolymerization of ethylene with different comonomers in the presence of surface-active substances and with the aid of compounds forming free radicals is already known. For example, copolymer emulsions are obtained by polymerization of ethylene and vinyl acetate in aqueous medium with the aid of inorganic peroxy compounds, such as potassium peroxydisulfate, or of redox systems, such as potassium peroxydisulfate in combination with sodium formaldehyde sulfoxylate, in the presence of a fatty alcohol sulfate or an alkyl sulfate as emulsifier.

An important disadvantage of such polymer emulsions is the high emulsifier content, it even being necessary in certain cases also to add a protective colloid, such as polyvinyl alcohol in order to obtain stable aqueous polymer dispersions. The emulsifier or protective colloid content of for example 10% by weight and higher, based on polymer, is found to be particularly very disturbing when these emulsions are used for impregnating or coating paper, textiles, leathers and other substrata. Such coatings are highly hydrophilic, show a high degree of swelling in water and in many cases can even be re-emulsified.

It is also known to polymerize ethylene by itself or together with one or more ethylenically unsaturated polymerizable compounds, without addition of emulsifiers, in aqueous medium. However, it is not emulsions which are obtained by this process, but polymers which can be separated out by filtration.

In detail, it has now been found that it is possible to produce stable aqueous dispersions of copolymers of ethylene without adding conventional emulsifiers if ethylene is polymerized in aqueous medium under pressures between 50 and 500 atmospheres and at temperatures between 50 and 100° C. with the aid of water-soluble substances capable of forming free radicals in the presence of (A) 10 to 60 percent by weight, calculated on copolymer, of an ethylenically unsaturated polymerizable non-ionic compound containing at least one $CH_2=C<$ group, and (B) 5 to 30 percent by weight, calculated on copolymer, of an ethylenically unsaturated polymerizable acid, whereby the ratio by weight between ethylene and said ethylenically unsaturated, polymerizable, non-ionic compound (A) is not to fall substantially below the value of 1:1 for ethylene.

As conventional emulsifiers within the scope of the aforementioned explanations, there are to be understood those non-copolymerizable substances of low molecular weight which, on account of particular structural features, are capable of forming micellae in aqueous solution and are in the position to disperse in more or less stable manner substances which are not or are sparingly soluble in water. The said structural features of an emulsifier are at least one highly hydrophobic molecule group, such as for example with 15 to 20 carbon atoms, and at least one highly hydrophilic group, such as the sulfonate, sulfate or quaternary ammonium group.

As ethylenically unsaturated polymerizable, non-ionic compounds containing at least one $CH_2=C<$ group (A) within the scope of the present invention, there are to be understood:

(1) Compounds with a terminal grouping $CH_2=CR-$, wherein R can represent a hydrogen atom, a low alkyl radical or a halogen atom. The following are to be mentioned as representatives of this group of compounds—

(a) Acrylic and methacrylic acid derivatives, such as acrylic or methacrylic acid esters, advantageously with monohydric saturated aliphatic or cycloaliphatic alcohols, acrylic or methacrylic acid amide as well as their substituted amides, acrylonitrile and methacrylonitrile.

(b) Vinyl esters, more especially of saturated fatty acids having from 2 to 5 carbon atoms, such as vinyl acetate, vinyl propionate, vinyl butyrate, furthermore vinyl stearate and others.

(c) Aromatic vinyl compounds such as styrene, styrenes alkylated in the nucleus and side chains, such as α-methyl styrene, vinyl toluene, styrenes halogenated in the nucleus and side chains, such as α-chlorostyrene, and also polyfunctional compounds, such as divinyl benzene.

(d) Vinyl halides such as vinyl chloride and vinylidene chloride.

Preferably suitable as ethylenically unsaturated, polymerizable, non-ionic compounds are members of the following group: low aliphatic vinyl esters, i.e. from aliphatic saturated monocarboxylic acids having 2–5 carbon atoms, such as vinyl acetate, vinyl propionate, vinyl butyrate, styrene, vinyl chloride, acrylic esters as well as methacrylic esters being esterified with an aliphatic saturated monohydric alcohol having from 1 to 4 carbon atoms, such as methyl-, ethyl-, propyl- and butyl esters of the aforementioned acids.

As ethylenically unsaturated, polymerizable acid compounds (B) for the present process, there are in principle to be considered those compounds which have been referred to within the scope of the process disclosed in German patent application No. F 30,219, IVb/39c. The following are to be particularly mentioned:

(1) Semi-esters of α,β-unsaturated dicarboxylic acids, such as those of maleic or fumaric acids, the propyl, butyl, octyl, dodecyl or octadecyl semi-esters of maleic acid, (2) Unsaturated compounds containing carboxyl groups, the said carboxyl group being separated by at least three carbon or hetero atoms from a carbon-carbon double bond activated by certain groups, and especially classes of compounds which contain halogen atoms and multiple bonds, such as are present in $C=O$ and $C=N$ groups or aromatic systems as activating grouping as well as oxygen, nitrogen or sulfur atoms as hetero atoms. In this connection, there are especially to be considered those compounds which conform to the general Formula I (I) 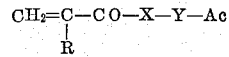

wherein

R=—H, —CH₃
X=—NH—, —O—
Y=straight-chained or branched divalent saturated alkyl radical with advantageously not more than 18 carbon atoms; or an organic divalent radical containing (1) a plurality of methylene groups and (2) one or more hetero atoms especially in form of urea or urethane groupings Ac=—COOH, —SO₃H or —OSO₃H As examples for this type of compounds there are to be mentioned methacryl glycine, methacrylamino caproic acid, methacrylamino undecanoic acid, methacrylic esters of glycolic acid or lactic acid, compounds such as

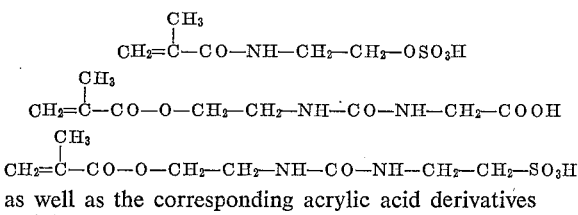

as well as the corresponding acrylic acid derivatives (3) Ethylenically unsaturated polymerizable sulfonic acids, sulfimides, CH-acid compounds or acid sulfuric acid semi-esters, where they do not come under Formula I, such as vinyl sulfonic acid, styrene sulfonic acid, and also compounds such as 3-methacrylaminobenzene sulfonic acid-(N-benzene sulfonyl) amide (II) or vinyl sulfonyl methylsulfonyl acetonitrile (III)

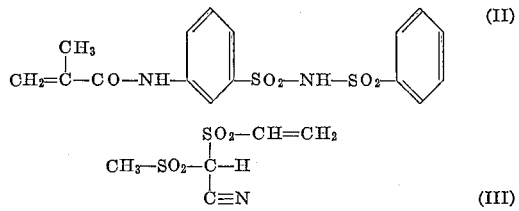

Within the scope of the present invention the members of the following group of compounds are of preferred interest, i.e. represent a special advantageous selection: maleic acid semi-esters being esterified with an saturated aliphatic monohydric alcohol of from 1 to 18 carbon atoms as for example the methyl, ethyl, propyl and butyl, octyl, decyl, octadecyl semi-esters; ethylenically unsaturated polymerizable sulfonic acids such as vinyl sulfonic acid and styrene sulfonic acid; amides of acrylic acid e.g. methacrylic acid and aliphatic saturated monoamino monocarboxylic acids having a carbon chain of from 2 up to 18 carbon atoms such as acryl- or methacrylamino butyric acid, acryl- or methacrylamino caproic acid, acryl- resp. methacrylamino undecanoic acid.

Where the said acids are used in the form of their salts, it is for example their alkali or ammonium salts which are suitable. It is obvious that mixtures of these acids and salts can also be used.

The quantity of ethylenically unsaturated polymerizable acids (B) or their salts should be within 5 to 30% by weight and advantageously 5 to 20% by weight calculated on the total amount of copolymer. The ratio by weight between ethylene and ethylenically unsaturated, polymerizable, non-ionic compound should substantially not fall below the value 1:1 for ethylene. Preferably, the polymer should contain incorporated therein by polymerization 20 to 60% by weight of ethylene and 10 to 60% by weight of ethylenically unsaturated, polymerizable, non-ionic compound (A), respectively.

It is obvious that the proportions of the said three monomer groups relatively to one another must be so chosen that when using partially or completely water-soluble ethylenically unsaturated, polymerizable, non-ionic compounds, the quantity thereof is kept so low that it is possible to form an emulsion and a solution polymerization does not occur. It is advisable to use smallest possible quantities of ethylenically unsaturated polymerizable acids, so that the water resistance of the polymers which are obtained or of the coatings or impregnations which can be produced with the emulsions according to the invention is not reduced. The optimum quantity of the ethylenically unsaturated, polymerizable acids or their salts differs from case to case and depends on the nature and quantity of the other comonomers. On the other hand, if extremely large quantities of ethylenically unsaturated, polymerizable acids or their salts are used, no more latices are obtained or water-soluble products are produced.

In order to produce particular latex properties, the additional use of a conventional emulsifier, such as perhaps lauryl sulfate, is permissible in subordinate quantities, but such an addition naturally has an unfavorable influence on the water swelling of the coatings and impregnations which are produced.

It is occasionally advantageous to add small amounts of solution promoters to the polymerization mixture in order to increase the solubility of the starting components. Advantageous for this purpose are water-soluble, organic solvents with low transfer constants, such as tertiary butanol. For example, tertiary butanol is preferably used in such quantities that the aqueous phase contains up to 20% by volume of tertiary butanol.

The initiation of the polymerization in accordance with the present process is effected by substances which must be water-soluble and capable of forming free radicals, such as potassium, sodium or ammonium peroxy-disulfates, perborates, hydrogen peroxide or others. The said water-soluble peroxy compounds can moreover also be used in the form of so-called redox systems, i.e. in combination with reducing agents, in a manner known per se. Suitable reducing agents are for example sodium pyrosulfite or bisulfite, sodium formaldehyde sulfoxylate or triethanolamine. Initiator quantities of 0.1 to 3% by weight, based on polymer, are sufficient in this case for producing stable emulsions.

Since the hydrogen ion concentration of the reaction medium is displaced in the direction of lower pH values during the polymerization when using alkali peroxy disulfates, it is often advantageous, for producing high yields, to add buffering substances to the reaction medium in order to avoid a lowering of the pH value into the strongly acid medium. Mixtures of primary and secondary potassium phosphates are for example suitable for this purpose. The polymerization according to the present invention is carried out at ethylene pressures in the range of from 50 atmospheres up to about 500 atmospheres.

The temperature depends on the initiator or initiator system actually being used and polymerization temperatures below 100° C. and more especially between 50 and 85° C. are to be preferred.

Numerous possibilities of practical use are provided for the dispersions prepared according to the invention. For example, transparent films of very good flexibility are obtained by drying such emulsions, especially at relatively high temperatures. By application of the dispersions to suitable substrata, such as paper, textiles, leather and the like, impregnations are produced which are characterized by a remarkably low sensitivity to water and moisture. The emulsions are also suitable for coatings, in which case the good resistance to water is particularly apparent.

Where an isloation of the polymers is desired, this can be achieved inter alia by coagulating the emulsions with strong mineral acids and drying the coagulates. In this way, colorless polymers are obtained, the properties of which depend on the nature and quantity of the monomers used. They can be pressed at temperatures above 100° C. to give completely transparent sheets or moulded element, which are resistant to swelling, even with respect to hot water.

*Example 1*

A mixture of:

5.00 parts by weight of potassium peroxy disulfate
13.85 parts by weight of maleic acid propyl semi-ester
87.5 parts by weight of normal potassium hydroxide solution 100.00 parts by weight of an aqueous buffering solution, which contains 16.575 g. of $K_2HPO_4$ and 0.681 g. of $KH_2PO_4$ per liter and has a pH value of 8.2, and
760.00 parts by weight of distilled water is placed in a stainless steel high-pressure stirrer type autoclave. After adding 60 parts by weight of vinyl acetate, the autoclave is closed, flushed three times with a quantity of ethylene corresponding to 10 atmospheres and thereafter filled to a pressure of about 70 atmospheres with ethylene. After heating to 70° within 30 minutes, the pressure rises to about 130 atmospheres. Ethylene is forced in until a pressure of 200 atmospheres is reached and polymerization is carried out, while stirring well, for 11 hours at 70° C., the drop in pressure being made up hourly to 200 atmospheres of ethylene (this polymerization technique is used in similar manner in the following examples). Altogether, a quantity of ethylene corresponding to a pressure droy of 500 atmospheres is subsequently introduced under pressure. After cooling and relieving the pressure, there are obtained 1030 parts by weight of a white emulsion having a pH value of 6 and a solid content of 19.6% by weight. It is possible to obtain therefrom by coagulation a polymer powder which can be pressed at a temperature above 100° C. to give colorless sheets, which are characterized by high flexibility, light fastness and hydrophobic properties. The polymer has a density of 0.973 at 25° C. It contains about 29% by weight of vinyl acetate, 9% by weight of semi-ester and 62% by weight of ethylene.

In the foregoing example it is possible to employ instead of maleic acid propyl semi-ester also maleic acid ethyl semi-ester as well as maleic acid butyl semi-ester on the one hand and instead of vinyl acetate also vinyl propionate without disadvantage.

Example 2

Under the reaction conditions as set out in Example 1, a solution of 5 parts by weight of potassium peroxy disulfate
13.85 parts by weight of maleic acid propyl semi-ester
87.5 parts by weight of normal potassium hydroxide solution
700 parts by weight of distilled water
100 parts by weight of buffering solution, and
80 parts by weight of tertiary butanol is polymerized within 10 hours at 70° C. and an ethylene pressure of 200 atmospheres after adding 60 parts by weight of vinyl acetate. There are obtained 1106 parts by weight of a stable emulsion with a solid content of 21.8% by weight. The polymer contains about 25% by weight of vinyl acetate, 6% by weight of semi-ester and 69% by weight of ethylene.

Example 3

By using 10 parts by weight of maleic acid octyl semi-ester, and
44 parts by weight of normal potassium hydroxide solution instead of the quantities of semi-ester and potassium hydroxide solution used in Example 1, there are obtained under otherwise identical conditions 1010 parts by weight of a coagulate-free emulsion with the pH value 5 and 19% by weight solid content. After coagulation in the usual manner, a flexible polymer is obtained which has a breaking elongation of 142% and a tensile strength of 42 kg./cm.². The polymer contains about 31% of vinyl acetate, 5% of semi-ester and 64% of ethylene.

Instead of vinyl acetate it is possible to use methacrylic acid butyl ester as non-ionic ethylenically unsaturated comonomer.

Example 4

By using 30 parts by weight of maleic acid octadecyl semi-ester, which has been prepared with the use of industrial octadecyl alcohol and has a molecular weight of 340, and 88 parts by weight of normal potassium hydroxide solution, instead of the corresponding components in Example 1, 1050 parts by weight of a coagulate-free emulsion with the pH value 5 and with 19.2% by weight solid content are obtained after otherwise the same conditions and after a pressure drop totalling 500 atmospheres. The copolymer isolated by coagulation is flexible, completely transparent, water-repellent and contains about 31% of vinyl acetate, 16% of semi-ester and 53% of ethylene.

Example 5

Using the reaction conditions as indicated in Example 1, a solution of 4 parts by weight of potassium peroxy disulfate
30 parts by weight of industrial maleic acid octadecyl semi-ester (see Example 4)
88 parts by weight of normal potassium hydroxide solution
760 parts by weight of distilled water
100 parts by weight of buffering solution, with addition of
60 parts by weight of butyl acrylate is polymerized and, after 12 hours, 1113 parts by weight of a coagulate-free emulsion are obtained with a pH value of 6 and with 19% by weight of solid content. The copolymer isolated by coagulation contains about 30% of butyl acrylate, 15% of semi-ester and 55% of ethylene, and has a density (at 25° C.) of 0.951.

In this example it is possible to use ethyl acrylate or propyl acrylate as well as the corresponding methacrylates instead of butyl acrylate without disadvantage.

Example 6

A mixture of 4 parts by weight of potassium peroxy disulfate
30 parts by weight of industrial maleic acid octadecyl semi-ester (see Example 4)
88 parts by weight of normal potassium hydroxide solution
760 parts by weight of distilled water
100 parts by weight of buffering solution, and
49 parts by weight of styrene is polymerized for 18 hours at 70° C. 1100 parts by weight of a coagulate-free emulsion are obtained with the pH value 6 and with 16.2% by weight solid content. The polymer isolated by coagulation has a strength of 97 kg./cm.² and a breaking elongation of 24%.

Example 7

If a mixture of 4 parts by weight of potassium peroxydisulfate
30 parts by weight of sodium vinyl sulfonate
850 parts by weight of distilled water
100 parts by weight of buffering solution, and
30 parts by weight of vinyl acetate is polymerized for 7½ hours at 75° C.; 1058 parts by weight of an emulsion are obtained with a solid content of 15.6% by weight.

In the foregoing example there may be employed instead of vinyl sulfonic acid (resp. its sodium salt) styrene sulfonic acid as well as compounds according to formulae

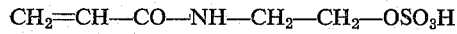

and

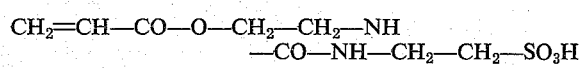

Example 8

A mixture of 5 parts by weight of potassium peroxy disulfate
13.85 parts by weight of maleic acid propyl semi-ester
88 parts by weight of normal potassium hydroxide solution 770 parts by weight of distilled water
100 parts by weight of buffering solution
40 parts by weight of vinyl acetate
20 parts by weight of methyl acrylate is polymerized for 11 hours at 70° C. and 1100 parts by weight of a coagulate-free emulsion are obtained with a solid content of 17% by weight.

*Example 9*

A mixture of 5 parts by weight of ammonium peroxy disulfate
10 parts by weight of methacrylamino caproic acid
46.5 parts by weight of normal potassium hydroxide solution
750 parts by weight of distilled water
100 parts by weight of buffering solution
80 parts by weight of tertiary butanol
30 parts by weight of butyl acrylate
30 parts by weight of vinyl propionate is polymerized for 8 hours at 80° C. and at 150 atmospheres of ethylene. 1120 parts by weight of a stable coagulate-free emulsion are obtained with a solid content of 23% by weight.

*Example 10*

74 parts by weight of the sodium salt of taurine were dissolved in 30 ml. of water and the pH value adjusted to about 10 by means of diluted NaOH solution. After adding 78 parts by weight of methacrylic acid ethyl ester-β-isocyanate this solution was stirred for 2 hours. The solution obtained in this manner (A) may be used directly for the following polymerization.

A mixture of 5 parts by weight of potassium peroxy disulfate
45 parts by weight of solution (A), containing 15 parts by weight of the compound

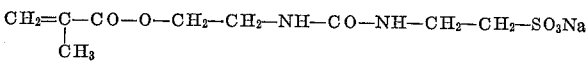

100 parts by weight of buffering solution
80 parts by weight of tertiary butanol
40 parts by weight of vinyl acetate
30 parts by weight of vinyl propionate is polymerized at 75° C. using an ethylene pressure of about 250 atmospheres within 7½ hours. 1095 parts by weight of a coagulate-free emulsion, having a solid content of about 22% is obtained.

We claim:

1. A process for production of stable aqueous dispersions of ethylene copolymers in the absence of conventional emulsifiers which comprises polymerizing ethylene in aqueous medium under pressures between 50 and 500 atmospheres and at temperatures between 50° and 100° C. with the aid of water-soluble substances capable of forming free radicals in the presence of (A) 10 to 60 percent by weight, based on the weight of copolymer, of an ethylenically unsaturated polymerizable, non-ionic compound selected from the group consisting of esters of vinyl alcohol and an alkanoic acid having 2 to 5 carbon atoms, styrene, vinyl chloride, and acrylic and methacrylic esters of aliphatic saturated monohydric alcohols having from 1 to 4 carbon atoms, the ratio by weight between ethylene and said ethylenically unsaturated, polymerizable, non-ionic compound having a value which is not substantially below 1:1, and (B) 5 to 30 percent by weight, based on the weight of copolymer, of an ethylenically unsaturated polymerizable acid selected from the group consisting of maleic acid semi-esters which are esterified with a saturated aliphatic monohydric alcohol of from 1 to 18 carbon atoms, ethylenically unsaturated polymerizable sulfonic acids, and amides of the formula:

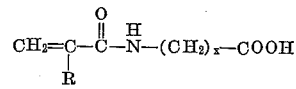

wherein R is selected from the group consisting of H and CH$_3$ and $x$ is an integer of from 1 to 17.

2. The process of claim 1, wherein the polymerization of ethylene in the presence of said compound (A) and said compound (B) is carried out at pH values between 5.0 and 8.5 with the aid of a redox system consisting of a water-soluble alkali metal persulfate and a water-soluble reducing agent.

3. The process of claim 1, wherein said polymerization of ethylene in the presence of said compound (A) and said compound (B) is carried out at pH values between 5.0 and 8.5.

4. The process of claim 1, wherein said aqueous medium contains up to 20% by volume of tertiary butanol.

5. Stable aqueous dispersions of ethylene copolymers as prepared by the process of claim 1.

6. Stable aqueous dispersions of ethylene copolymers containing tertiary butanol as prepared by the process of claim 4.

References Cited by the Examiner

UNITED STATES PATENTS

| | | | |
|---|---|---|---|
| 2,395,327 | 2/1946 | Hanford | 260—78.5 |
| 2,402,136 | 6/1946 | Hanford | 260—78.5 |
| 3,073,806 | 1/1963 | Reinhard | 260—29.6 |

WILLIAM H. SHORT, *Primary Examiner.*

J. NORRIS, *Assistant Examiner.*